(12) United States Patent
Lefebvre et al.

(10) Patent No.: US 11,851,202 B1
(45) Date of Patent: Dec. 26, 2023

(54) AIRCRAFT ENGINE, GAS TURBINE INTAKE THEREFORE, AND METHOD OF GUIDING EXHAUST GASSES

(71) Applicant: PRATT & WHITNEY CANADA CORP., Longueuil (CA)

(72) Inventors: Guy Lefebvre, St-Bruno-de-Montarville (CA); Christopher Gover, Longueuil (CA); Remy Synnott, Varennes (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/808,389

(22) Filed: Jun. 23, 2022

(51) Int. Cl.
*B64D 33/02* (2006.01)
*F02C 7/04* (2006.01)
*F01D 25/24* (2006.01)

(52) U.S. Cl.
CPC ............. *B64D 33/02* (2013.01); *F01D 25/24* (2013.01); *F02C 7/04* (2013.01)

(58) Field of Classification Search
CPC ............ B64D 33/02; F01D 25/24; F02C 7/04
See application file for complete search history.

(56) References Cited

U.S. PATENT DOCUMENTS

| | | | |
|---|---|---|---|
| 2,385,366 A | 9/1945 | Lysholm | |
| 2,801,043 A | 7/1957 | Spotz et al. | |
| 3,396,906 A | 8/1968 | Newton | |
| 4,219,306 A * | 8/1980 | Fujino | F04D 17/12 415/62 |
| 4,996,839 A | 3/1991 | Wilkinson et al. | |
| 5,145,215 A | 9/1992 | Udell | |
| 5,611,663 A * | 3/1997 | Kotzur | F01D 15/12 415/122.1 |
| 6,692,224 B2 * | 2/2004 | Miura | F04D 25/163 415/66 |
| 6,783,321 B2 | 8/2004 | Lathrop et al. | |
| 6,935,838 B1 * | 8/2005 | Wang | F04D 25/02 415/199.1 |
| 7,074,009 B2 | 7/2006 | Allmang et al. | |
| 7,107,973 B1 * | 9/2006 | Jones | F04D 25/163 417/406 |
| 7,147,433 B2 | 12/2006 | Ghizawi | |
| 9,228,485 B2 * | 1/2016 | Svihla | F02B 29/0412 |
| 9,328,738 B2 | 5/2016 | Yokoyama et al. | |
| 9,835,165 B2 | 12/2017 | Jinnai et al. | |
| 10,030,581 B2 | 7/2018 | Gekht et al. | |

(Continued)

FOREIGN PATENT DOCUMENTS

| | | |
|---|---|---|
| CN | 107725195 | 2/2019 |
| DE | 19936170 | 2/2001 |
| GB | 571022 | 8/1945 |

*Primary Examiner* — Igor Kershteyn
(74) *Attorney, Agent, or Firm* — Norton Rose Fulbright Canada LLP

(57) ABSTRACT

The gas turbine intake can have a swirl housing having an inlet portion fluidly connecting an exhaust conduit, an annular outlet defined around a central axis and fluidly connecting a turbine gas path, a swirl path extending circumferentially around the central axis from the inlet portion to a circumferential outlet, the circumferential outlet fluidly connected back into the inlet portion, and vanes located in the swirl housing, the vanes circumferentially interspaced from one another relative the central axis and located radially inwardly from the swirl path relative the central axis, the swirl path being free of the vanes.

20 Claims, 6 Drawing Sheets

(56) References Cited

U.S. PATENT DOCUMENTS

| | | |
|---|---|---|
| 10,428,986 B2 | 10/2019 | Yeandel |
| 2014/0212277 A1 | 7/2014 | Jesugi |
| 2014/0318119 A1* | 10/2014 | Svihla ................. F02B 29/0412 |
| | | 60/599 |
| 2015/0056065 A1 | 2/2015 | Takama et al. |

* cited by examiner

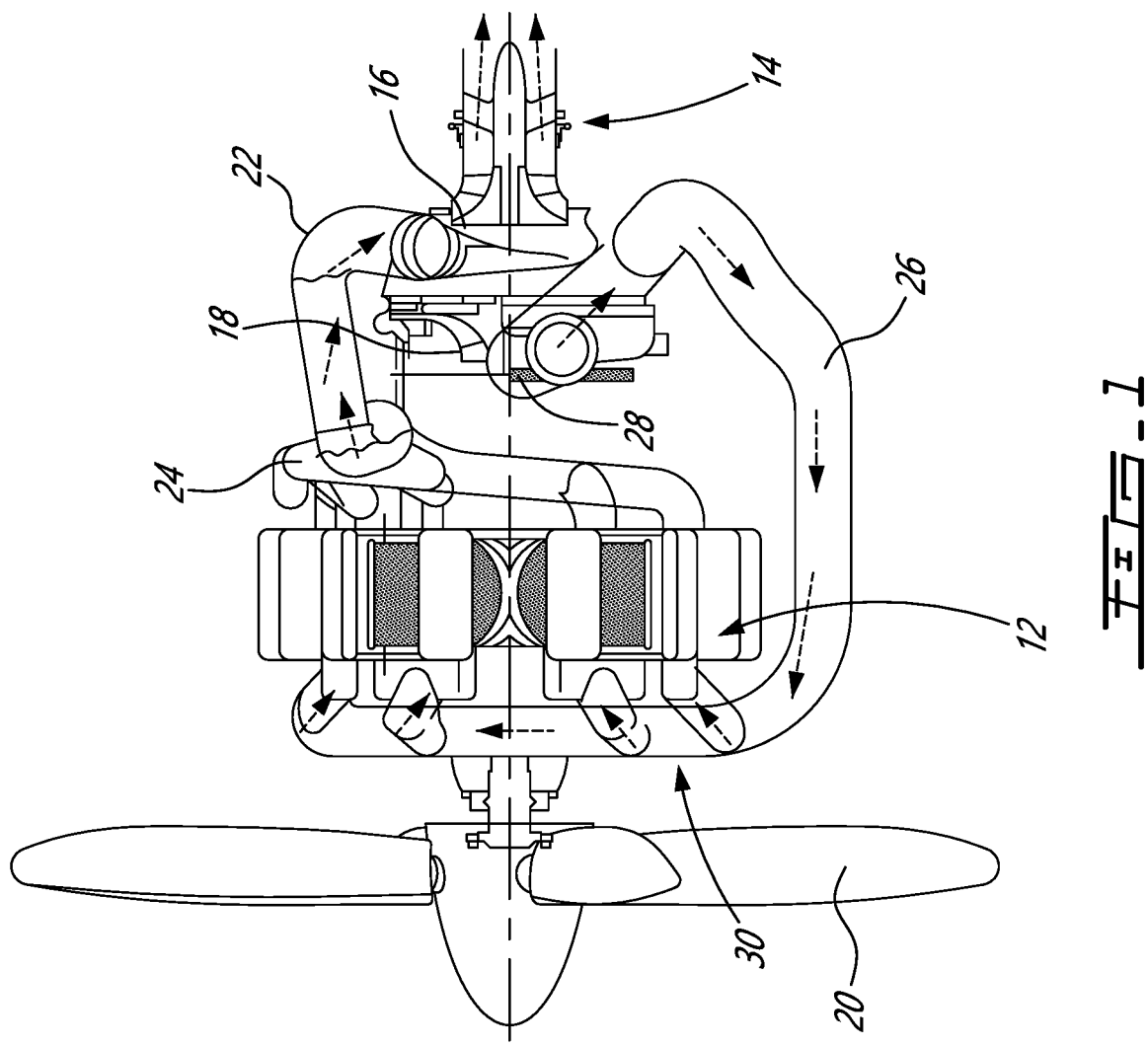

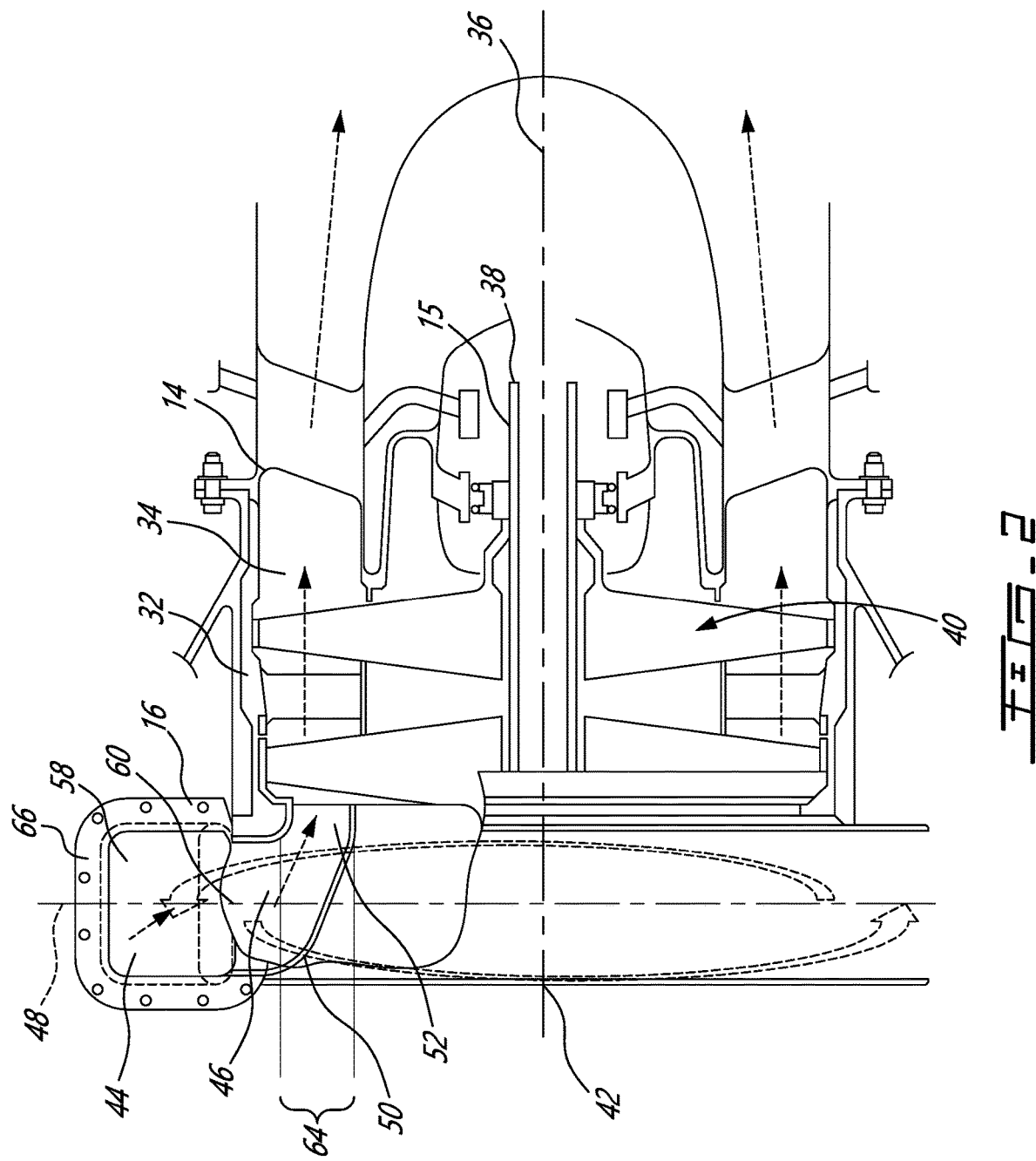

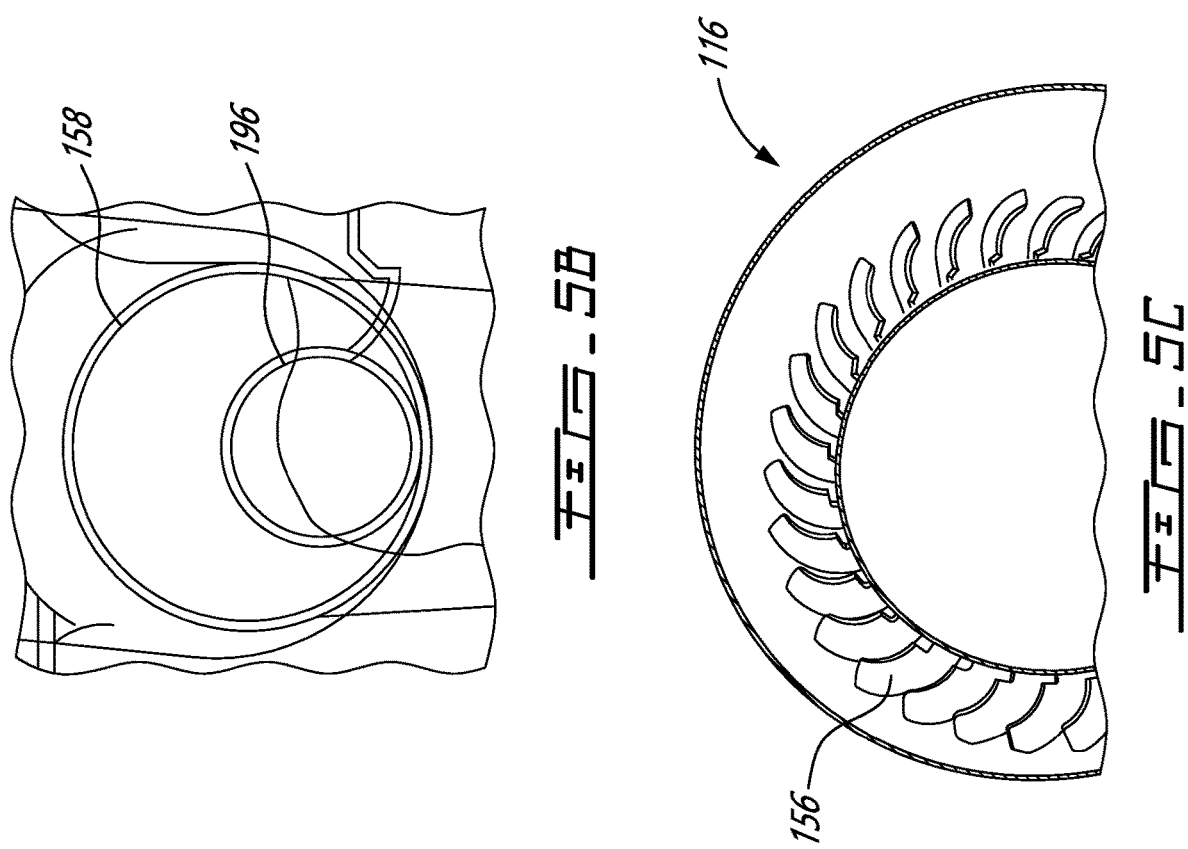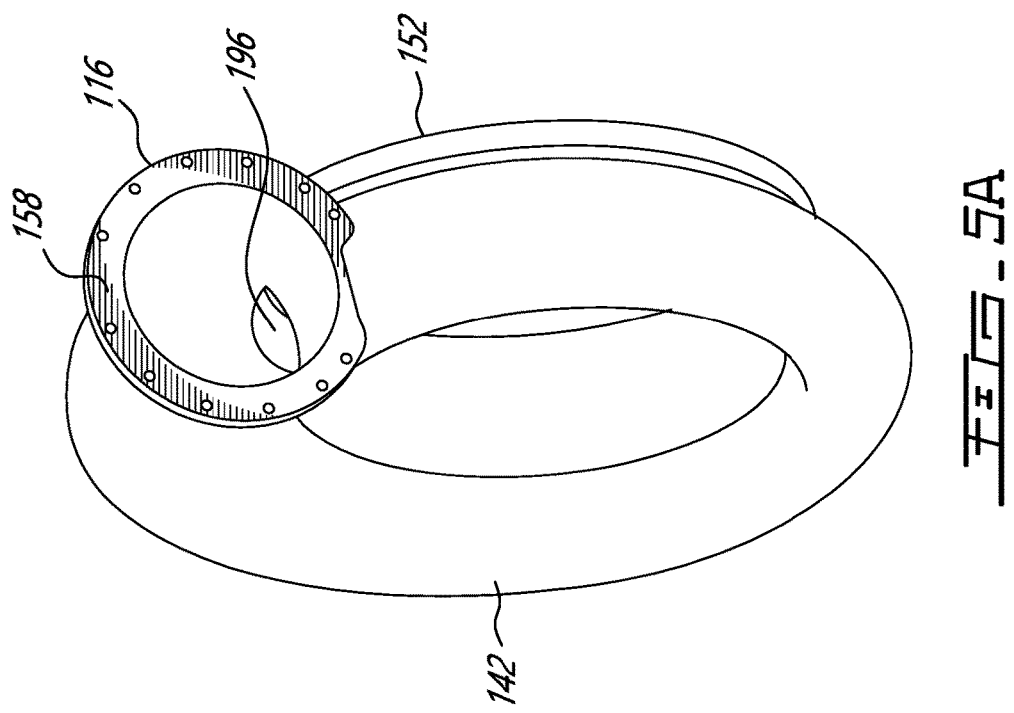

AIRCRAFT ENGINE, GAS TURBINE INTAKE THEREFORE, AND METHOD OF GUIDING EXHAUST GASSES

TECHNICAL FIELD

The application relates generally to aircraft engines and, more particularly, to a gas turbine intake.

BACKGROUND OF THE ART

A gas turbine typically has an annular flow path. In an axial flow path configuration, the annular flow path may extend axially across one or more alternating sets of stator vanes and rotary blades. In a gas turbine engine, the gas path extends annularly and in sequence across one or more compressor stages and a combustor upstream of one or more turbine stages, and the gas turbine in the form of the one or more turbine stages may readily receive an annular flow of hot gasses from the combustor. In some other embodiments, such as gas turbines which can be used for powering a propulsor and/or powering a compressor, the source of hot exhaust gasses may not be readily available in an annular configuration, and a challenge can exist in transitioning the hot exhaust gas flow from its source configuration to an annular configuration. Such challenges can be amplified when taking additional factors into consideration such as limiting aerodynamic losses, limiting weight, limiting manufacturing costs, etc. There always remains room for improvement.

SUMMARY

In one aspect, there is provided an aircraft engine comprising: an exhaust conduit; at least one combustion engine having an exhaust gas outlet fluidly connected to the exhaust conduit; at least one gas turbine having a casing defining a radially outer limit of an annular gas path extending along and around a central axis, and at least one rotor having a shaft concentric to the central axis, a plurality of blades circumferentially interspaced from one another around the central axis and protruding radially from the shaft across the annular gas path; and a gas turbine intake having a swirl housing having an inlet portion fluidly connecting the exhaust conduit, an annular outlet fluidly connecting the annular gas path, a swirl path extending circumferentially around the central axis from the inlet portion to a circumferential outlet, the circumferential outlet fluidly connected back into the inlet portion, and vanes located in the swirl housing, the vanes circumferentially interspaced from one another relative the central axis and located radially inwardly from the swirl path relative the central axis, the swirl path being free of the vanes.

In another aspect, there is provided a gas turbine intake comprising: a swirl housing having an inlet portion fluidly connecting an exhaust conduit, an annular outlet defined around a central axis and fluidly connecting a turbine gas path, a swirl path extending circumferentially around the central axis from the inlet portion to a circumferential outlet, the circumferential outlet fluidly connected back into the inlet portion, and vanes located in the swirl housing, the vanes circumferentially interspaced from one another relative the central axis and located radially inwardly from the swirl path relative the central axis, the swirl path being free of the vanes.

In a further aspect, there is provided a method of guiding exhaust gasses to a gas turbine, the method comprising: tangentially receiving the exhaust gasses at a circularly extending swirl path, recirculating a portion of the received exhaust gasses around the swirl path, manifolding the swirl path into a plurality of circumferentially distributed guide paths, each guide path scooping the exhaust gasses at a corresponding portion of the swirl path and redirecting a circumferential velocity of the exhaust gasses to an axial orientation, the guide paths collectively outputting an annular, axially oriented, flow of exhaust gasses.

DESCRIPTION OF THE DRAWINGS

Reference is now made to the accompanying figures in which:

FIG. 1 is a schematic cross-sectional view of a gas turbine engine;

FIG. 2 is a cross-sectional view, enlarged, of a portion of the gas turbine engine of FIG. 1;

FIGS. 5A to 5C are a collection of views of a gas turbine intake in accordance with an embodiment, including an oblique view from a distal side, a tangential elevation of the inlet portion, and a fragmented distal side elevation view.

DETAILED DESCRIPTION

Figure 3B:
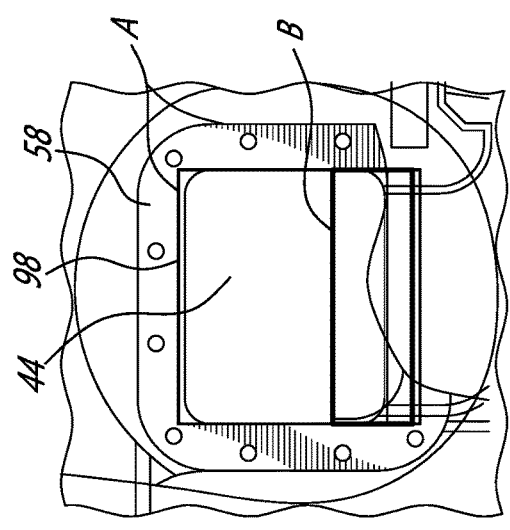
FIGS. 3A to 3C are a collection of views of a gas turbine intake in accordance with an embodiment, including an fragmented oblique view from a proximal side, a tangential elevation, and an oblique view from a distal side.

FIG. 1 illustrates an aircraft engine 10 of a type preferably provided for use in subsonic flight, generally comprising a combustion engine 12 in which compressed air is mixed with fuel and ignited delivering power and exhaust gasses. The exhaust gasses are collected from the combustion engine 12 and directed to a gas turbine 14. The gas turbine 14 can convert energy in the form of heat, pressure and/or velocity of the exhaust gasses into angular velocity of a rotor 15, and the rotor 15 can be used to direct power to one or more other device, such as a compressor 18, a propulsor 20 (e.g. propeller, fan), and/or an electric machine acting as a generator. The transfer of power can be direct, or via a clutch and/or a gearbox.

In the illustrated embodiment, the combustion engine 12 can have one or more combustion engine units such as piston engine units, and/or Wankel engine units for instance. The exhaust gasses can be collected from one or more exhaust gas outlet of the combustion engine 12 via an exhaust conduit 22 such as an exhaust pipe, optionally via an exhaust manifold 24 which connects an exhaust pipe to individual engine units. The exhaust conduit 22 can be straight, continuously curved, or made of straight sections interconnected via one or more elbows, to name some examples. The exhaust conduit 22 can provide a linear flow of exhaust gasses, whereas the gas turbine 14 can be configured for receiving an annular stream of exhaust gasses. A gas turbine intake 16 can be provided for connecting the exhaust conduit 22 to the gas turbine 14. The gas turbine intake 26 can be configured for receiving the linear flow of exhaust gasses from the exhaust conduit 22, distributing it circumferentially, re-orienting its velocity from a circumferential to an axial orientation, and feeding it as an axially-oriented annular stream to the gas turbine 14, as will be seen more clearly in FIG. 2.

In this embodiment, a compressor 18 is provided. The compressor 18 can be a centrifugal compressor for instance, and be used to boost the pressure of air from the environment in order to feed higher pressure air to the intake of the combustion engine 12. More specifically, compressed air can be collected from the compressor 18 by a compressed air pipe, such as via a helical scroll 28 for instance, and fed to the combustion engine 12, optionally via an intake manifold 30. The compressor 18 can be powered by the gas turbine 14, by the combustion engine 12, and/or by an auxiliary electric engine, to name some examples. The compressor 18 is optional.

FIG. 2 presents a sectioned, enlarged view of an example gas turbine intake 16 coupled to a gas turbine 14. In this example, the gas turbine 14 has a casing 32 defining a radially outer limit of an annular gas path 34 extending along and around a central axis 36, and a rotor 15 having a shaft 38 concentric to the central axis 36. The rotor 15 has a plurality of blades 40, and more specifically in this embodiment an axial sequence of two sets of blades. The blades 40 of each set are circumferentially interspaced from one another around the central axis 36, and the two sets are axially separated from one another by a set of vanes. The blades 40 protrude radially from the shaft 38 across the annular gas path 34. The blades 40 rotate in a plane or in a conical virtual surface, and the gas travels across the blades 40 generally perpendicular to the orientation of the length of the blades 40, i.e. the blades are not configured to carry the fluid along an axial to radial transition such as "impeller" type blades, and both receive and output fluid mainly in the axial orientation (i.e. mainly parallel to the central axis). The vanes are made integral to the casing 32 and are thus non-rotary by contrast with the blades 40. In this example, the radially internal limit of the annular gas path 34 is defined in part by a hub of the vanes, and the vanes protrude radially internally from the outer portion of the casing 32 to the hub. Alternate embodiments can have additional sets of blades, additional sets of vanes, or both additional sets of vanes and blades. While the annular gas path 34 can be said to extend generally axially along the gas turbine 14, it will be understood that in some embodiments, the gas path 34 can extend obliquely or in a curved manner, such as having both conical and cylindrical portions for instance. In some embodiments, it can be preferred to have a set of vanes immediately upstream the first (or only) set of blades, for controlling the swirl in the flow, and/or controlling the angle of attack of the blades relative to the incoming flow of air, which may affect efficiency of energy transfer between the fluid and the blades as known to persons having ordinary skill in the art.

In this embodiment, the gas turbine intake 16 has a swirl housing 42 having a first, radially-outer internal portion thereof forming a swirl path 44. The swirl path 44 extends circumferentially around the central axis 36, and more specifically continuously around the central axis 36 in this embodiment. An inlet portion 58 can lead tangentially into the swirl path 44. The swirl housing 42 has a second, radially-inner internal portion defining an annular elbow 46 between a radial orientation 48 and an axial orientation 50. The annular elbow 46 is provided radially inwardly of the swirl path 44, and fluidly connects the swirl path 44 to the annular outlet 52.

The gas turbine intake 16, and in particular the swirl path 44, extend generally circumferentially, i.e. in a radially-extending plane 48. In this embodiment, the swirl path 44 does not extend helically; in other words, it does not shift in the axial orientation as the gasses circulate in the circumferential orientation. The annular outlet 52 of the gas turbine intake leads directly to the annular gas path 34 of the gas turbine 14, i.e. not via a combustor or compressor.

Figure 3C:
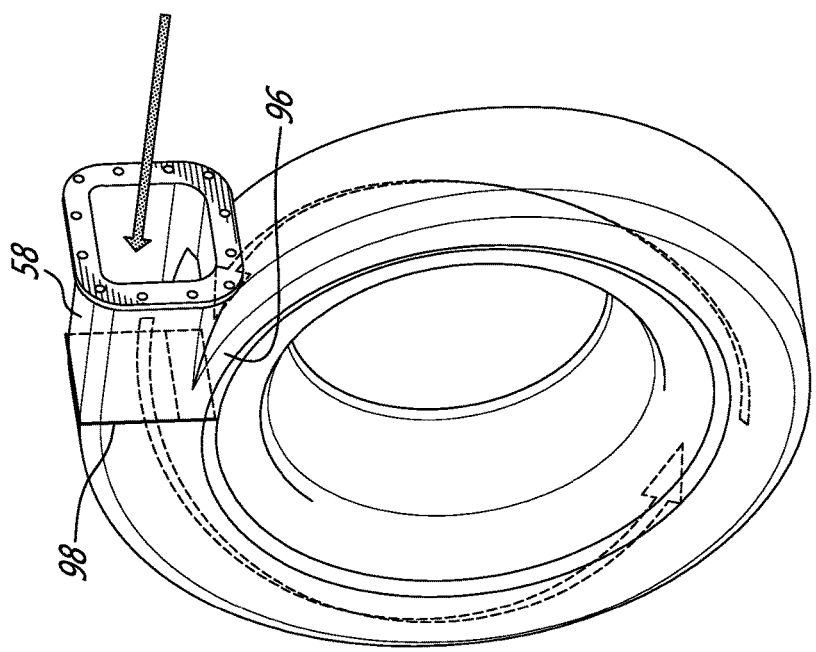
Figure 3A:
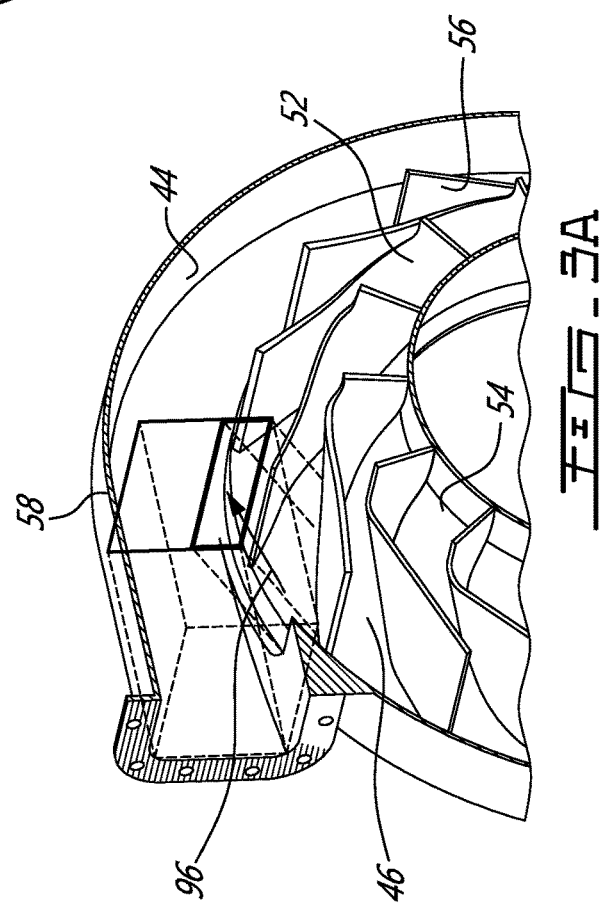

Referring to FIG. 3A, in an embodiment, a plurality of vanes 56 are provided in the annular elbow 46, the plurality of vanes 56 manifolding the swirl path 44 into a plurality of circumferentially interspaced guide paths 54. Each guide path 55 can scoop circumferentially circulating gasses from the swirl path 44 and aerodynamically redirect their circumferential velocity to radially inward velocity and to axial velocity. The redirection can be done aerodynamically in a manner to limit aerodynamic losses. The redirection can be performed in a manner to limit or otherwise control the occurrence of swirl at the annular outlet 52, and to otherwise direct the flow of gasses in a manner to optimize efficiency of the turbine 14. In an alternate embodiment, the plurality of vanes can be confined to the annular outlet, instead of extending radially outwardly therefrom. In still another alternate embodiment, the plurality of vanes can be omitted.

The swirl path 44 extends radially outwardly of the annular elbow 46, and extends continuously, i.e. being free from the plurality of vanes 56 and out from interference therewith, such that exhaust gasses can circulate circumferentially in an unimpeded manner. The swirl path 44 extends circumferentially around the central axis from the inlet portion 58 to a circumferential outlet 96. The circumferential outlet 96 fluidly connects back into the inlet portion 58. Exhaust gasses circulating around the swirl path 44 are thus free to recirculate more than one time, but in practice, the pressure differential and velocity can guide most of the exhaust gasses via the vanes 56, to the annular outlet 52. Notwithstanding the above, the reconnection of the circumferential outlet 96 of the swirl path 44 back into the inlet portion 58 can have some interesting effects. For instance, the reconnection of the circumferential outlet 96 of the swirl path 44 back into the inlet portion 58 can be configured to provide a pressure balancing effect, such that the swirl path 44 can act as a balanced plenum, where the pressure and velocity are relatively uniformly distributed around the swirl path 44, throughout changing operating conditions. There could be a significant challenge in achieving uniform pressure and velocity distribution around the swirl path 44 if the swirl path 44 was closed at its end circumferentially opposite the inlet portion 58, and the balance could be fragile and lost upon changing operating conditions (e.g. changes in velocity, pressure and/or temperature of the flow).

The reconnecting swirl path 44 can thus sustain a relatively uniform swirling flow of gasses. Given this uniformity of the swirling flow, the inlets of a plurality of guide paths 54 formed between corresponding pairs of vanes 56 can be exposed to similar fluid conditions independently of their circumferential location around the central axis 36. Accordingly, optimizing the shape of one of the guide paths 54 from the point of view of minimizing aerodynamic losses and any other relevant consideration, can lead to optimizing the shape of all the guide paths 54, when the guide paths 54 all have the same geometry. Accordingly, vanes 56 having a same geometry can be used all around the swirl housing. Using vanes 56 which have the same geometry can be additionally interesting from a design perspective, especially when taking into consideration manufacturing constraints. Indeed, it can be particularly easier to manufacture a gas turbine intake 16 where all the vanes 56 have the same geometry than to manufacture a gas turbine intake where the vanes have different geometries. This is independently from the potential aerodynamic benefits of guiding the flow across the annular elbow 46 from a relatively uniform circumferential distribution.

In equilibrium, i.e. non-transient, conditions, when a given flow rate of exhaust gasses are fed through the inlet portion 58 into the swirl path 44, an equivalent flow rate of exhaust gasses will leave the annular outlet 52. Between the swirl path 44 and the annular outlet 52, the flow rate of exhaust gasses can be relatively equally distributed between the plurality of guide paths 54, meaning that a corresponding portion of the flow rate is subtracted from the swirl path 44 at each guide path inlet, and a lower and lower flow rate remains in the swirl path 44 along circumferential travel. In light of this effect, it can be preferred to use a swirl path geometry which progressively reduces in cross-section along the circumferential direction, between the inlet portion 58 and the circumferential outlet 96.

In the embodiment presented in FIG. 3A-3C, the swirl housing 42 has a generally rectangular geometry at the swirl path 44. It was found that the rectangular geometry could be particularly suitable to a configuration having vanes having the same geometry. In the context of the rectangular geometry shown in FIG. 3B, it will be noted that the swirl path 44 has a rectangular cross-section 98 which shortens in the radial orientation between the inlet portion 58 and the circumferential outlet 96 between a generally square shape A and a shortened rectangular shape B. The radial center of the rectangular cross-section can be seen to travel radially inwardly as a result of the shortening of the rectangular cross-section 98. By contrast, a circular geometry such as shown in FIG. 5B, can reduce in cross sectional area by having a smaller cross-sectional diameter at the tangential outlet 196 than at the inlet portion 158. This can impose constraints on the geometry of vanes 156 which may need to have varying inlet widths to adapt to the change in diameter along the circumference.

Figure 4B:
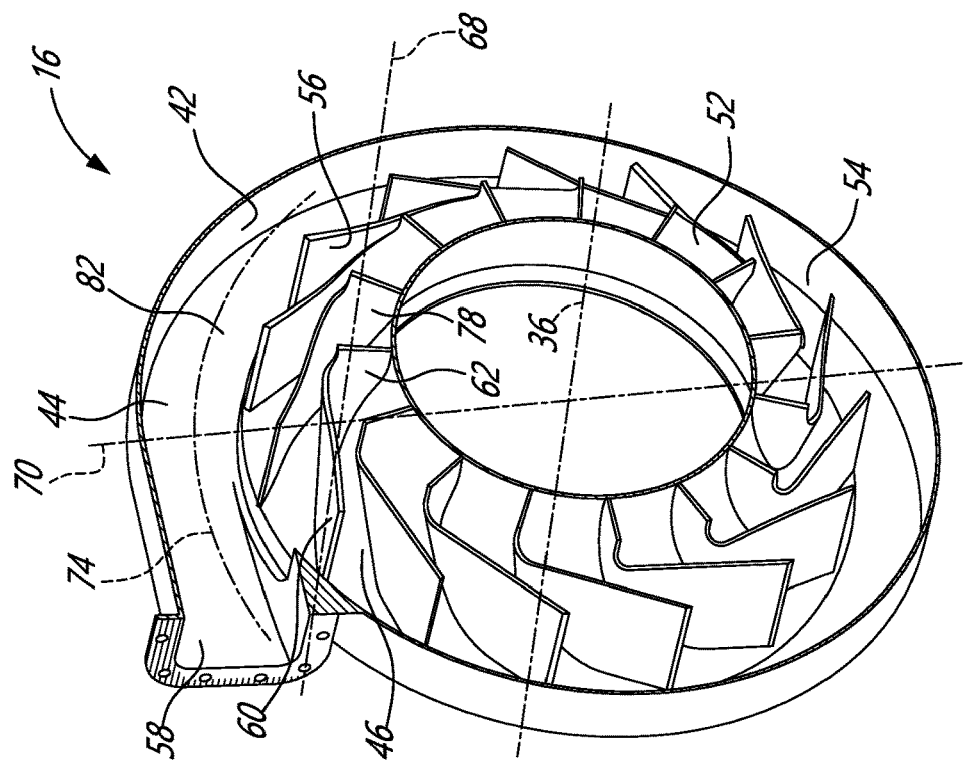
FIGS. 4A to 4D are a collection of views of a gas turbine intake in accordance with a first embodiment, including an oblique view from a proximal side, a partly sectioned view from the proximal side, an oblique and fragmented view from a distal side, and a fragmented tangential view.
Figure 4A:
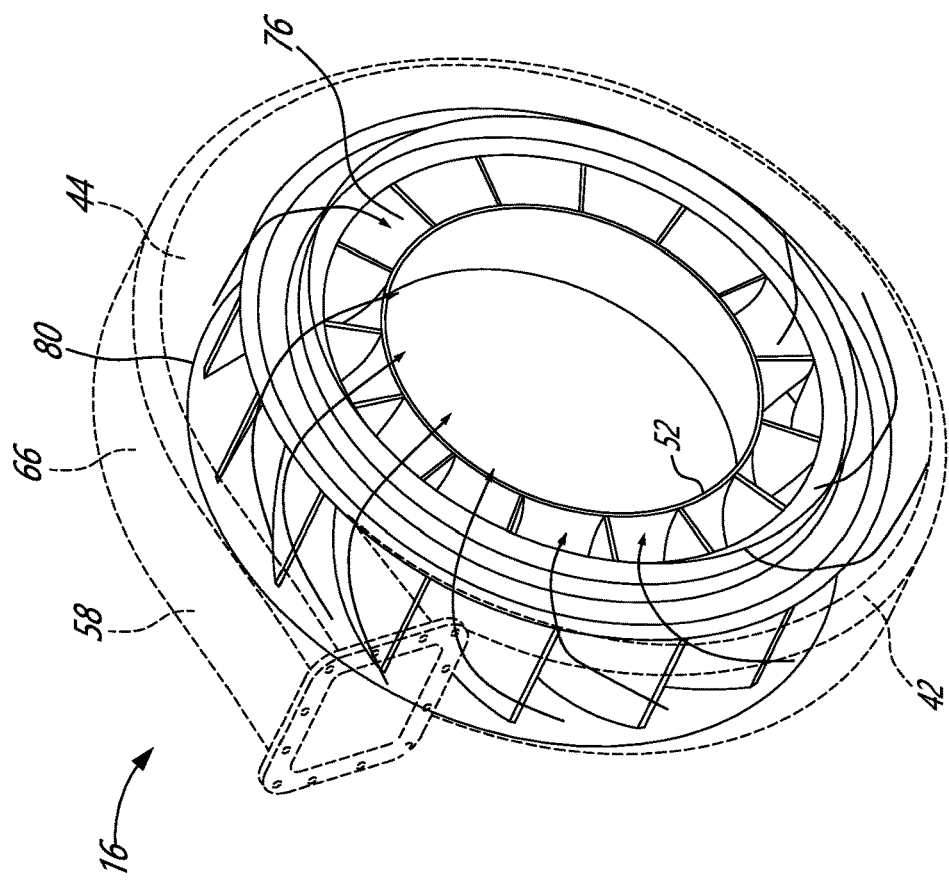

FIGS. 4A and 4B present an example embodiment having such a plurality of vanes 56 in greater detail. The vanes 56 can extend from a leading end 60 configured for scooping circumferentially circulating gasses from the swirl path 44, to a trailing end 62 positioned in the annular outlet 52. The vanes 56 have a (generally) flat body which twists, including by being curved radially outwardly between the trailing end 62 and the leading end 60. As shown in FIG. 2, the leading end 60 can protrude radially outwardly from a virtual axial projection 64 of the annular outlet 62. The swirl path 44 is located yet further radially outwardly than the leading end 60 and can be said to extend between a radially outer edge, or leading edge, of the leading end 60 and a radially outer wall 66. In an alternate embodiment, the leading end 60 can be confined within the virtual axial projection 64 of the annular outlet 62.

In FIG. 4B, the circumferential distribution of the vanes 56 can be seen more clearly, as is the configuration where they are circumferentially interspaced from one another relative the central axis 36. Each vane 56 has a twisted and flat body which can be said to have a length extending between the trailing end 62 and the leading end 60. The leading end 60 is oriented mainly circumferentially and axially at the swirl path 44. More specifically, in this embodiment, the leading end 60 slopes radially inwardly from the tangential/circumferential orientation, for scooping gasses from the swirl path 44 and directing them radially inwardly towards the annular outlet 52. The trailing end 62 is oriented mainly axially and radially at the annular outlet 52. The flat body of the vane 56 is twisted along its length.

More specifically, the flat body of the vane 56 can be said to be twisted around two axes. Firstly, as seen in the figure, the flat body of the vane can be said to be twisted around the central axis, such as more specifically around an axial axis 68 which is parallel to the central axis 36, as evidenced by the fact that the flat body can be seen to be bent around such an axis 68 between the leading end 60 and the trailing end 62, and that the trailing end 62 terminates radially inwardly relative the leading end 60. Secondly, as seen in the figure, the flat body of the vane 56 can be said to be twisted around a radial axis 70 perpendicular to the central axis 36, as evidenced by the fact that the flat body can be seen to be bent around such an axis 70 between the leading end 60 and the trailing end 62, and that the trailing end 62 terminates axially offset from the leading end 60. The twisting around both axes results in a flat body shape which curves relatively smoothly and aerodynamically between a leading edge 76 of the leading end 60 which can be perfectly axial for instance, and a trailing edge 78 of the trailing end 62 which can be perfectly radial for instance, while being circumferentially, radially, and axially offset from the leading edge 76, with the flat body extending smoothly and continuously, in a twisted manner between the trailing edge 78 and the leading edge 76. The geometry of each one of the vanes is the same relative the central axis, meaning that the orientation of the vanes changes in an absolute frame of reference by pivoting progressively around the circumference, but from the point of view of its orientation relative the axis, the geometry of each vane is the same in this embodiment.

The swirl housing 42 can be said to have a number of generally annularly extending walls. For instance, the swirl housing 42 can be said to have a radially outer wall 66 which can form a radially outer limit of the swirl path 44, an axially proximal wall 80, and an axially distal wall 82. The axially proximal wall 80 can be said to extend annularly and radially between the annular outlet 52 and the radially outer wall 66. The axially distal wall 82 can be said to extend annularly and include a curved portion 86 between a radially-extending portion 84 and an axially-extending portion 88, as best seen in FIG. 4C. More specifically, the radially-extending portion 84 can connect the radially outer wall 66, whereas the axially-extending portion 88 can have a proximal end forming a radially inner edge of the annular outlet 52, the radially outer edge of the annular outlet 52 being formed by a radially inner end of the axially proximal wall 80. The curved portion 86 can be reminiscent of the geometrical shape of a lower, radially-inner, quarter of a torus for example, and can be said to be a toroidally curved portion. The shape of the toroidally curved portion can be for instance a surface of revolution shape resulting from rotating a roughly 90° arc shape around a central axis.

The twisted guide paths 54 can be said to be defined as each extending circumferentially between two adjacent ones of the vanes 56, and between the axially distal wall 82 and the axially proximal wall 80. The twisted guide paths 54 can twist first around an axial axis 68 and then around a radial axis 70 (from the leading end 60 to the trailing end 62). In particular, the curved portion 86 of the axially distal wall 82 can provide for an aerodynamically smooth transition between the radial velocity orientation and the axial velocity orientation. More specifically, an axially proximal edge 92 of the flat body of each vane 56 can join the axially proximal wall 80, and an axially distal edge 84 of the flat body of each vane 56 can join the axially distal wall 82, with corresponding portions of the axially proximal wall 80 and of the axially distal wall 82, and corresponding vanes, forming corresponding walls of each guide path 54. The axially distal edge 94 can be significantly longer in spatial dimension than the axially proximal edge 92, as a result of the twisting of the flat body around the axes. It will be noted in this embodiment in particular that the axially distal edge 94 of the vane body can continuously follow the curved portion 86 of the axially distal wall 82 of the swirl housing 42. In this embodiment, the axially distal edge 94 does so by first extending generally circumferentially, with some degree of radially inward slope, and then gradually curving out axially inwardly, until reaching a generally axial orientation at the trailing end 62 where some degree of slope relative to an axial/tangential plane can be provided in a manner to optimize the orientation of the flow relative the gas turbine 14. A similar configuration can occur at the axially proximal edge 92, and a radially inner end of the axially proximal wall 80 can be similarly curved, though it can be less pronounced as a result of the fact that the radius of curvature can be significantly smaller at the axially proximal wall 80 than at the axially distal wall 82, given the general radial to axial transition geometry.

Figure 4D:
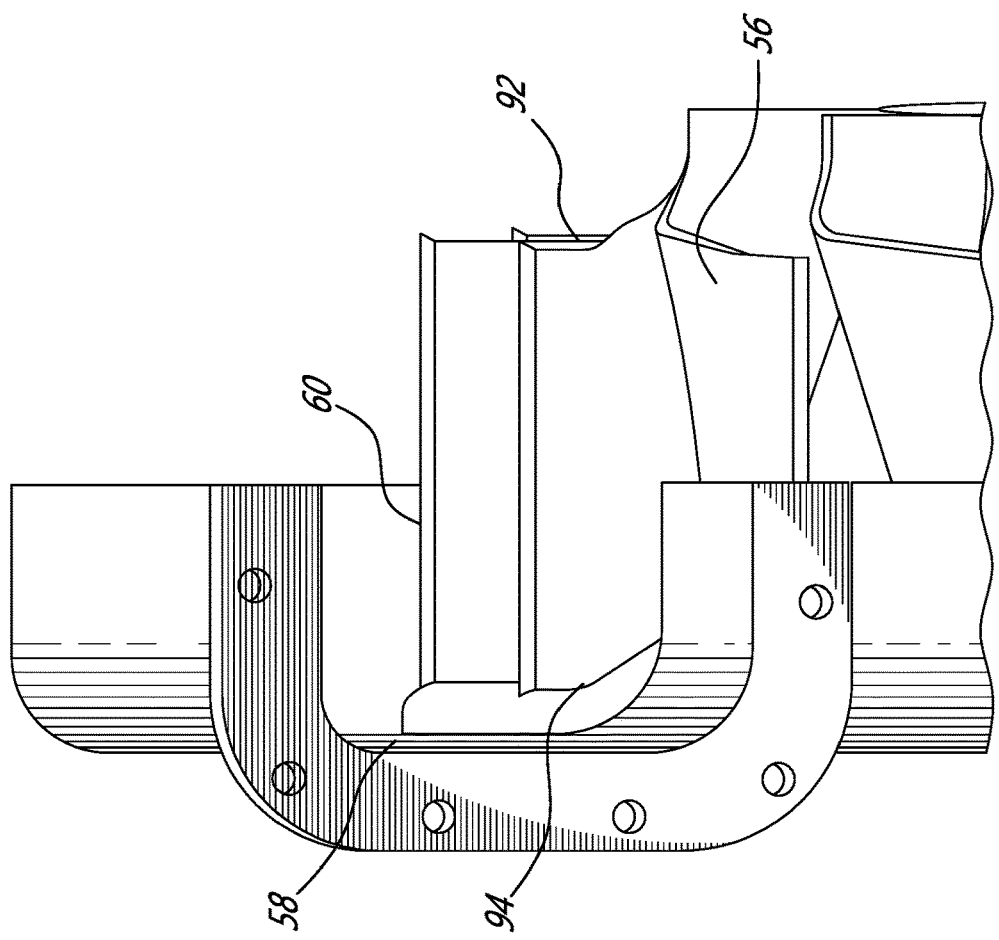
Figure 4C:
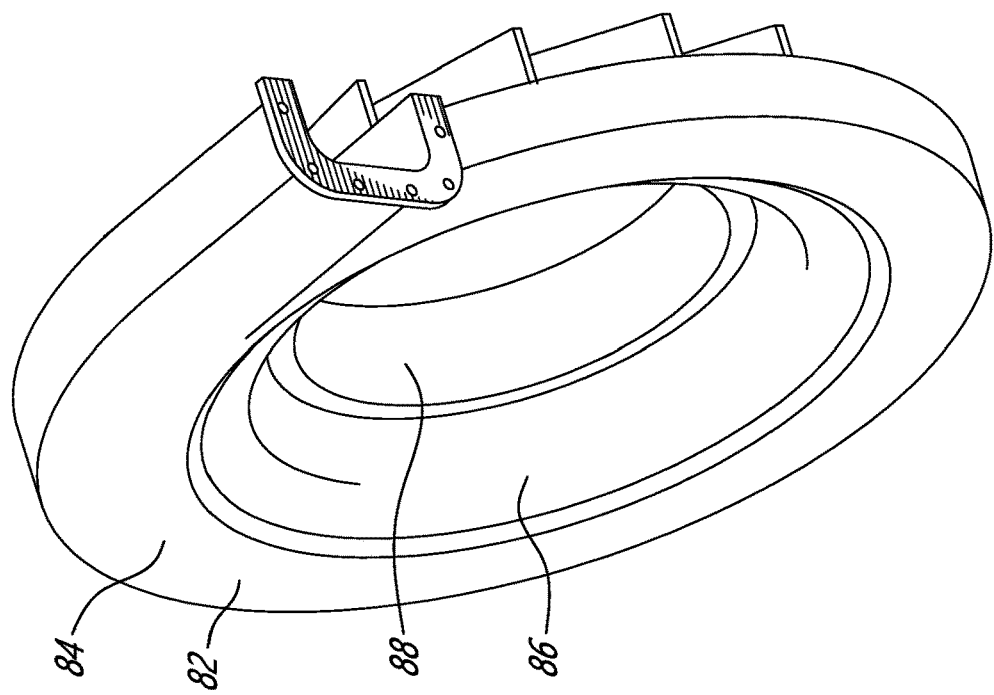

FIG. 4D presents a tangentially oriented, close-up view, of the leading end 60 of some of the vanes 56, through the inlet 58, providing an additional point of view of the geometry of the vanes 56 in accordance with an embodiment.

FIGS. 5A to 5B present another example embodiment of a gas turbine intake 116. The similarities and differences between the embodiment presented in FIGS. 4A to 4D and the embodiment presented in FIGS. 5A and 5B will now be detailed.

The embodiment presented in FIGS. 5A and 5B also presents a gas turbine intake 116 which has a swirl housing 142 having an inlet portion 158 for fluidly connecting an exhaust conduit, an annular outlet 152 defined around a central axis for fluidly connecting a turbine gas path, and a swirl path extending circumferentially around the central axis from the tangential inlet. The gas turbine intake 116 also has a plurality of vanes 156 located in the swirl housing 142, the vanes 156 circumferentially interspaced from one another relative the central axis. The vanes 156 each have a twisted and flat body, having a length extending from a leading end to a trailing end, the leading end being oriented mainly circumferentially and axially at the swirl path, the trailing end being oriented mainly axially and radially at the annular outlet 152. The twisted and flat body twists between the leading end and the trailing end around the central axis, and around a radial axis perpendicular to the central axis. Moreover, the swirl path, which extends circumferentially around the central axis, has a circumferential outlet 196 opposite the inlet 158, and fluidly communicates in a recirculating manner between the circumferential outlet 196 and the inlet 158.

However, contrary to the gas turbine intake 16 presented in FIG. 4A-4D, the cross-sectional geometry of the gas turbine intake 116 is generally circular rather than generally rectangular (with a rounded edge at the curved portion). The geometry of the guide vanes is adjusted accordingly.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, orientations, such as "axial", "radial", "tangential" are provided here in a manner to provide a general indication of how components are configured in three-dimensional space and are not to be interpreted strictly. For instance, "extending radially" means extending, at least to some extent, in the radial orientation. "Extending mainly radially" means extending within 45 degrees, such as within 30 degrees or within 15 degrees, of the radial orientation. Yet further modifications could be implemented by a person of ordinary skill in the art in view of the present disclosure, which modifications would be within the scope of the present technology.

The invention claimed is:

1. An aircraft engine comprising:
an exhaust conduit;
at least one combustion engine having an exhaust gas outlet fluidly connected to the exhaust conduit;
at least one gas turbine having a casing defining a radially outer limit of an annular gas path extending along and around a central axis, and at least one rotor having a shaft concentric to the central axis, a plurality of blades circumferentially interspaced from one another around the central axis and protruding radially from the shaft across the annular gas path; and
a gas turbine intake having a swirl housing having an inlet portion fluidly connecting the exhaust conduit, an annular outlet fluidly connecting the annular gas path, a swirl path extending circumferentially around the central axis from the inlet portion to a circumferential outlet, the circumferential outlet fluidly connected back into the inlet portion, and vanes located in the swirl housing, the vanes circumferentially interspaced from one another relative the central axis and located radially inwardly from the swirl path relative the central axis, the swirl path being free of the vanes.

2. The aircraft engine of claim 1 wherein the swirl housing further has an annular elbow between the swirl path and the annular outlet, the annular elbow extending mainly radially at the swirl path and mainly axially at the annular outlet, the vanes being located in the annular elbow, the swirl path located radially outwardly of the annular elbow relative the central axis.

3. The aircraft engine of claim 1 wherein the swirl path progressively reduces in cross-sectional area from the inlet portion to the circumferential outlet.

4. The aircraft engine of claim 1 wherein the swirl path has a rectangular cross-section which shortens in the radial orientation between the inlet portion and the circumferential outlet.

5. The aircraft engine of claim 1 wherein a geometry of each one of the vanes is the same relative the central axis, each vane having a twisted and flat body with a length extending from a leading end to a trailing end, the leading end being oriented mainly circumferentially and axially at the swirl path, the trailing end being oriented mainly axially and radially at the annular outlet, the twisted and flat body twisting between the leading end and the trailing end.

6. The aircraft engine of claim 1 wherein the swirl housing has a radially outer wall forming a radially outer limit of the swirl path, an axially proximal wall extending annularly and radially between the annular outlet and the radially outer wall, and an axially distal wall having a mainly radially-oriented portion connecting the radially outer wall, a mainly axially-oriented portion forming a radially inner edge of the annular outlet, and a curved portion bridging the mainly axially-oriented portion and the mainly radially-oriented portion.

7. The aircraft engine of claim 1 wherein the shaft of the gas turbine is mechanically connected to a shaft of the combustion engine.

8. The aircraft engine of claim 1 further comprising a compressor having an outlet fluidly connected to an intake of the combustion engine, the gas turbine mechanically driving the compressor.

9. The aircraft engine of claim 1 further comprising an electric machine operable as an electric generator, the gas turbine operable to drive the electric generator.

10. A gas turbine intake comprising: a swirl housing having an inlet portion fluidly connecting an exhaust conduit, an annular outlet defined around a central axis and fluidly connecting a turbine gas path, a swirl path extending circumferentially around the central axis from the inlet portion to a circumferential outlet, the circumferential outlet fluidly connected back into the inlet portion, and vanes located in the swirl housing, the vanes circumferentially interspaced from one another relative the central axis and located radially inwardly from the swirl path relative the central axis, the swirl path being free of the vanes.

11. The gas turbine intake of claim 10 wherein the swirl housing further has an annular elbow between the swirl path and the annular outlet, the annular elbow extending mainly radially at the swirl path and mainly axially at the annular outlet, the vanes being located in the annular elbow, the swirl path located radially outwardly of the annular elbow relative the central axis.

12. The gas turbine intake of claim 11 wherein the swirl path progressively reduces in cross-sectional area between the inlet portion and the circumferential outlet.

13. The gas turbine intake of claim 11 wherein the swirl path has a generally rectangular cross-section which flattens in the radial orientation between the inlet portion and the circumferential outlet.

14. The gas turbine intake of claim 11 wherein a geometry of each one of the vanes is the same relative the central axis, each vane having a twisted and flat body with a length extending from a leading end to a trailing end, the leading end being oriented mainly circumferentially and axially at the swirl path, the trailing end being oriented mainly axially and radially at the annular outlet, the twisted and flat body twisting between the leading end and the trailing end.

15. The gas turbine intake of claim 11 wherein the swirl housing has a radially outer wall forming a radially outer limit of the swirl path, an axially proximal wall extending annularly and radially between the annular outlet and the radially outer wall, and an axially distal wall having a mainly radially-oriented portion connecting the radially outer wall, a mainly axially-oriented portion forming a radially inner edge of the annular outlet, and a curved portion bridging the mainly axially-oriented portion and the mainly radially-oriented portion.

16. A method of guiding exhaust gasses to a gas turbine, the method comprising tangentially receiving the exhaust gasses at a circularly extending swirl path, recirculating a portion of the received exhaust gasses around the swirl path, manifolding the swirl path into a plurality of circumferentially distributed guide paths, each guide path scooping the exhaust gasses at a corresponding portion of the swirl path and redirecting a circumferential velocity of the exhaust gasses to an axial orientation, the guide paths collectively outputting an annular, axially oriented, flow of exhaust gasses.

17. The method of claim 16 further comprising the outputted annular, axially oriented flow of exhaust gasses driving a gas turbine, the gas turbine extracting power from the flow of exhaust gasses.

18. The method of claim 17 wherein said receiving the exhaust gasses includes receiving the exhaust gasses from a combustion engine, further comprising the gas turbine outputting mechanical power to the combustion engine.

19. The method of claim 18 further comprising the gas turbine outputting mechanical power to a compressor, the compressor compressing air upstream of an intake of the combustion engine.

20. The method of claim 16 further comprising the gas turbine outputting mechanical power to an electric machine operating as an electric generator.

* * * * *